United States Patent
He et al.

(10) Patent No.: US 11,881,924 B2
(45) Date of Patent: Jan. 23, 2024

(54) BEAM SELECTION FOR RECEIVING CHANNEL STATE INFORMATION REFERENCE SIGNALS FOR LAYER 3 MEASUREMENT

(71) Applicant: QUALCOMM Incorporated, San Diego, CA (US)

(72) Inventors: Qunfeng He, San Diego, CA (US); Huilin Xu, Temecula, CA (US); Awlok Singh Josan, San Francisco, CA (US); Yong Li, San Diego, CA (US); Lei Xiao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/444,801

(22) Filed: Aug. 10, 2021

(65) Prior Publication Data

US 2022/0045738 A1 Feb. 10, 2022

Related U.S. Application Data

(60) Provisional application No. 62/706,331, filed on Aug. 10, 2020.

(51) Int. Cl.
*H04B 7/08* (2006.01)
*H04B 7/06* (2006.01)
*H04W 56/00* (2009.01)

(52) U.S. Cl.
CPC ......... *H04B 7/0888* (2013.01); *H04B 7/0617* (2013.01); *H04B 7/0626* (2013.01); *H04W 56/001* (2013.01)

(58) Field of Classification Search
CPC ............ H04B 7/0617–0656; H04W 16/00–28; H04W 56/001
See application file for complete search history.

(56) References Cited

U.S. PATENT DOCUMENTS

| 2017/0295576 | A1* | 10/2017 | Fukuta | ................. | H04J 11/0069 |
| 2018/0084400 | A1* | 3/2018 | Park | ......................... | H04W 8/26 |
| 2020/0015236 | A1* | 1/2020 | Kung | ........................ | H04B 7/04 |
| 2021/0099885 | A1* | 4/2021 | Tsai | ...................... | H04W 64/00 |

* cited by examiner

*Primary Examiner* — Michael Thier
*Assistant Examiner* — Prince A Mensah
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates a channel state information reference signal (CSI-RS) Layer 3 (L3) signal corresponding to a first cell. The UE may select, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell. The UE may receive the CSI-RS L3 signal using the UE Rx beam. Numerous other aspects are provided.

30 Claims, 9 Drawing Sheets

US 11,881,924 B2

1

BEAM SELECTION FOR RECEIVING CHANNEL STATE INFORMATION REFERENCE SIGNALS FOR LAYER 3 MEASUREMENT

CROSS-REFERENCE TO RELATED APPLICATION

This Patent Application claims priority to U.S. Provisional Patent Application No. 62/706,331, filed on Aug. 10, 2020, entitled "BEAM SELECTION FOR RECEIVING CHANNEL STATE INFORMATION REFERENCE SIGNALS FOR LAYER 3 MEASUREMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam selection for receiving channel state information reference signals for Layer 3 measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a configuration that indicates a channel state information reference signal (CSI-RS) Layer 3 (L3) signal corresponding to a first cell; selecting, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell; and receiving the CSI-RS L3 signal using the UE Rx beam.

In some aspects, a method of wireless communication performed by a base station includes receiving, from a UE, a beam conflict indicator that indicates that the base station is to refrain from transmitting, to the UE, a downlink communication during a measurement time, wherein the measurement time is associated with a CSI-RS L3 signal corresponding to a neighbor cell; and refraining from transmitting the downlink communication during the measurement time.

In some aspects, a UE for wireless communication includes a memory; and one or more processors coupled to the memory, the memory and the one or more processors configured to: receive a configuration that indicates a CSI-RS L3 signal corresponding to a first cell; select, based at least in part on an AoA difference between a first AoA and a second AoA, a UE Rx beam for receiving the CSI-RS L3 signal, wherein the first AoA is associated with the CSI-RS L3 signal, and wherein the second AoA is associated with a communication corresponding to a second cell; and receive the CSI-RS L3 signal using the UE Rx beam.

In some aspects, a base station for wireless communication includes: a memory; and one or more processors coupled to the memory, the memory and the one or more processors configured to: receive, from a UE, a beam conflict indicator that indicates that the base station is to refrain from transmitting, to the UE, a downlink communication during a measurement time, wherein the measurement time is associated with a CSI-RS L3 signal corresponding to a neighbor cell; and refrain from transmitting the downlink communication during the measurement time.

In some aspects, a non-transitory computer-readable medium storing a set of instructions for wireless communication includes one or more instructions that, when executed by one or more processors of a UE, cause the UE to receive a configuration that indicates a CSI-RS L3 signal corresponding to a first cell; select, based at least in part on an AoA difference between a first AoA and a second AoA, a UE Rx beam for receiving the CSI-RS L3 signal, wherein the first AoA is associated with the CSI-RS L3 signal, and wherein the second AoA is associated with a communication corresponding to a second cell; and receive the CSI-RS L3 signal using the UE Rx beam.

In some aspects, a non-transitory computer-readable medium storing a set of instructions for wireless communication includes one or more instructions that, when executed by one or more processors of a base station, cause the base station to receive, from a UE, a beam conflict indicator that indicates that the base station is to refrain from transmitting, to the UE, a downlink communication during a measurement time, wherein the measurement time is associated with a CSI-RS L3 signal corresponding to a neighbor cell; and refrain from transmitting the downlink communication during the measurement time.

In some aspects, an apparatus for wireless communication includes means for receiving a configuration that indicates a CSI-RS L3 signal corresponding to a first cell; means for selecting, based at least in part on an AoA difference between a first AoA and a second AoA, a Rx beam for receiving the CSI-RS L3 signal, wherein the first AoA is associated with the CSI-RS L3 signal, and wherein the second AoA is associated with a communication corresponding to a second cell; and means for receiving the CSI-RS L3 signal using the Rx beam.

In some aspects, an apparatus for wireless communication includes: means for receiving, from a UE, a beam conflict indicator that indicates that the apparatus is to refrain from transmitting, to the UE, a downlink communication during a measurement time, wherein the measurement time is associated with a CSI-RS L3 signal corresponding to a neighbor cell; and means for refraining from transmitting the downlink communication during the measurement time.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
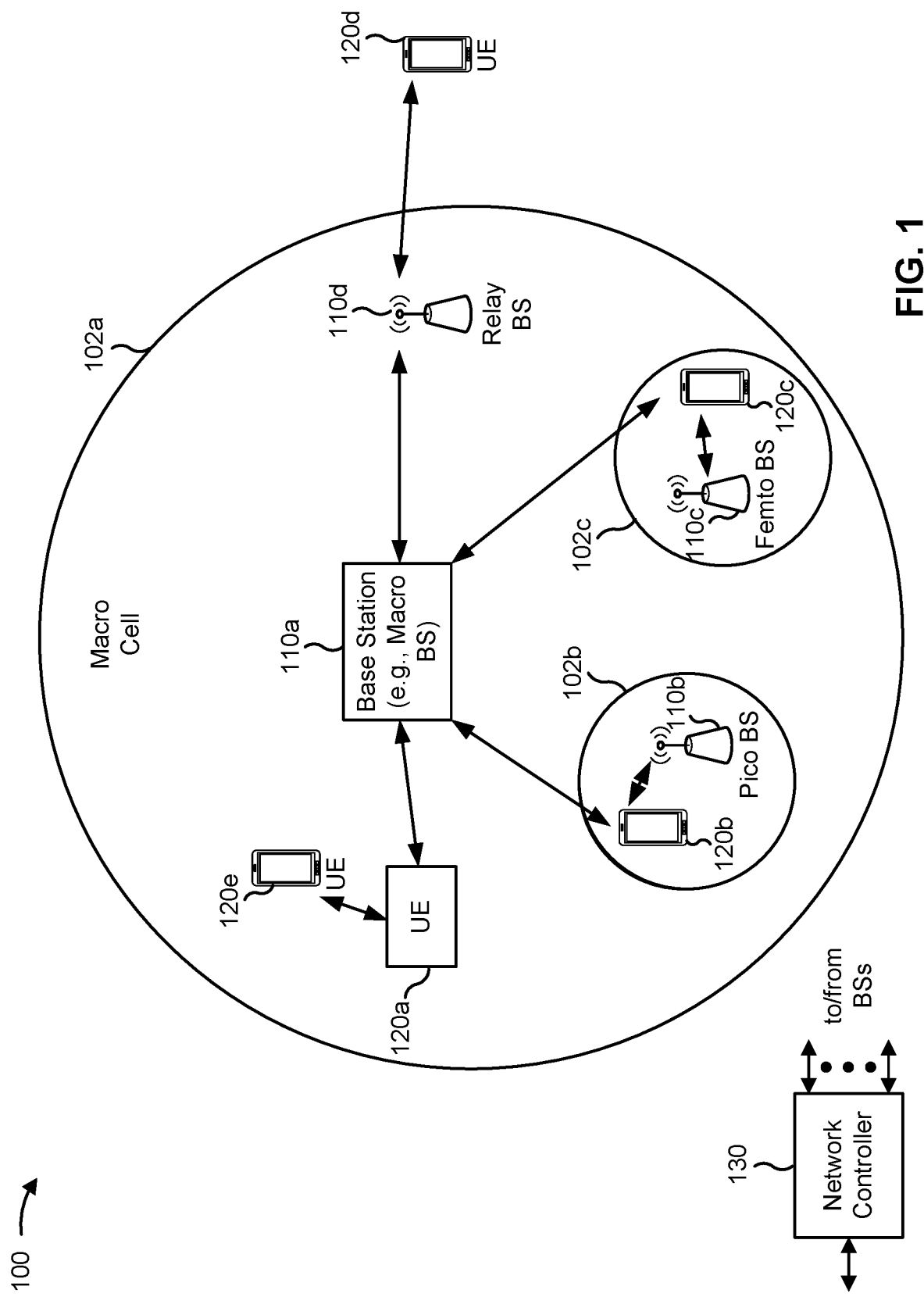
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
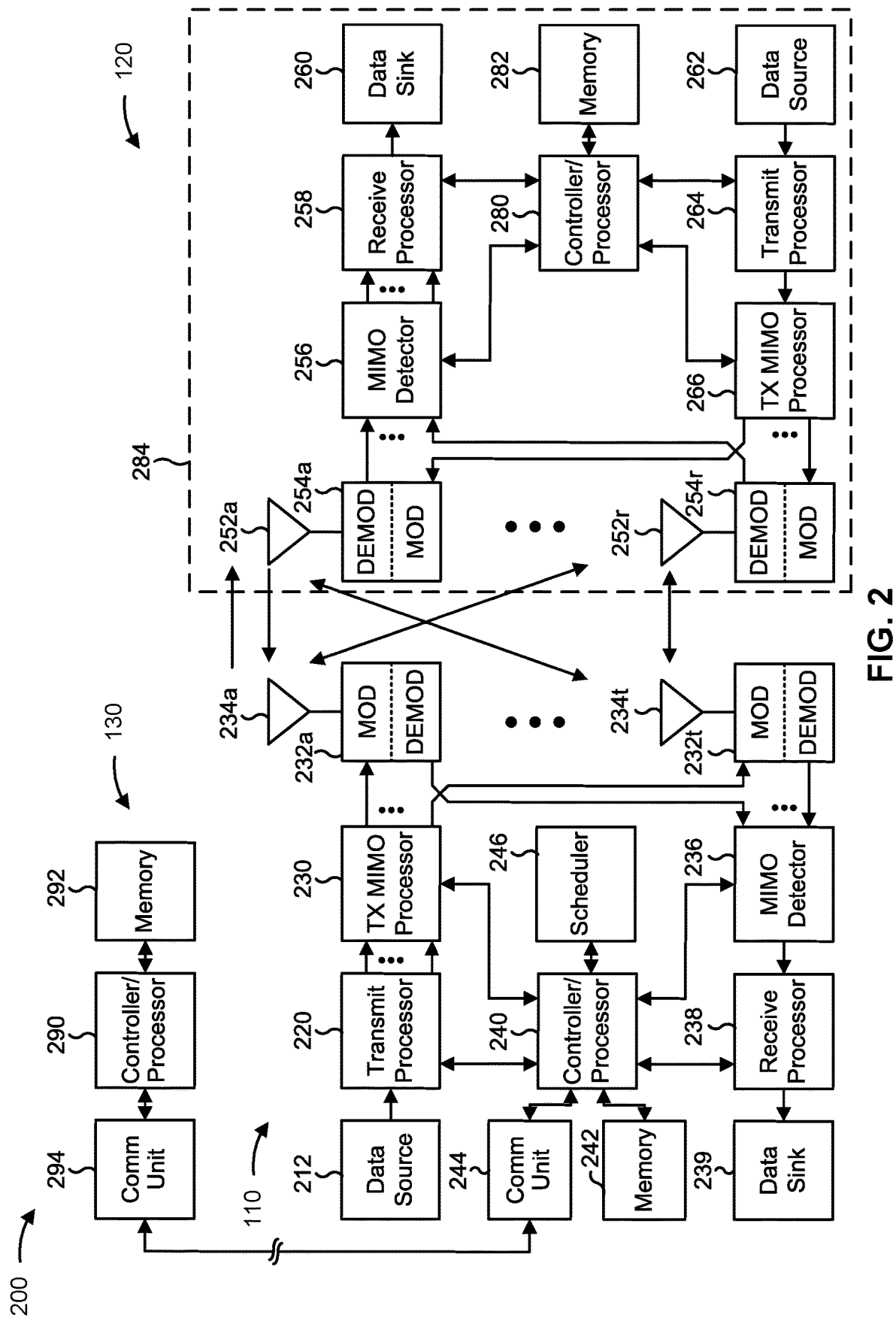
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e g, a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with beam selection for receiving channel state information reference signals (CSI-RSs) for Layer 3 (L3) measurement, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving a configuration that indicates a CSI-RS L3 signal corresponding to a first cell; means for selecting, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell; means for receiving the CSI-RS L3 signal using the UE Rx beam; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a beam conflict indicator that indicates that the base station is to refrain from transmitting, to the UE, a downlink communication during a measurement time, wherein the measurement time is associated with a CSI-RS L3 signal corresponding to a neighbor cell; means for refraining from transmitting the downlink communication during the measurement time; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
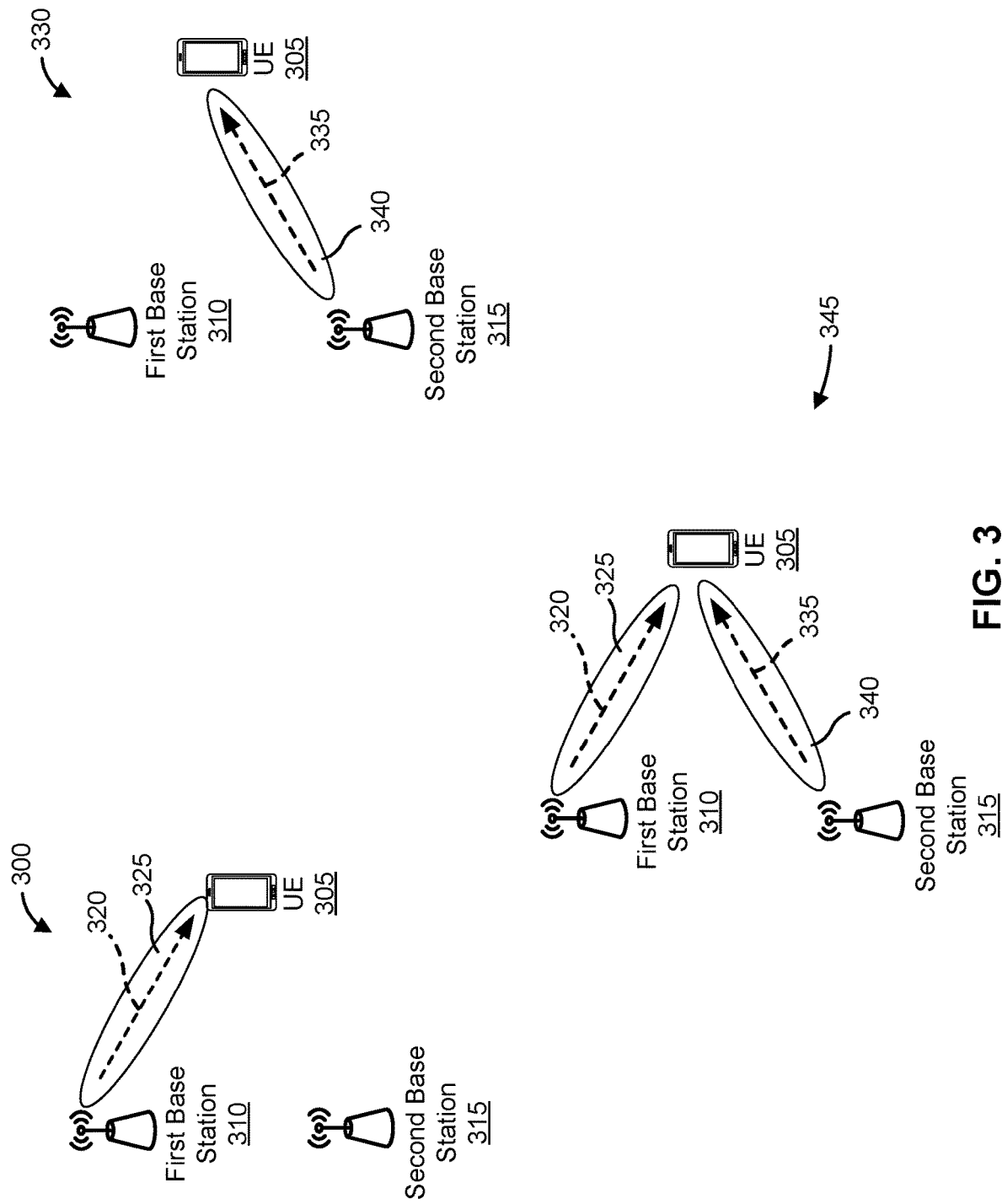
FIG. 3 is a diagram illustrating examples of multiple cell deployments, in accordance with the present disclosure.

FIG. 3 is a diagram illustrating examples of multiple cell deployments, in accordance with the present disclosure. As shown, a UE 305, a first base station 310, and a second base station 315 may communicate with one another. In some aspects, the UE may be, be similar to, include, or be included in the UE 120 shown in FIG. 1. In some aspects, the base station 310 and/or the base station 315 may be, be similar to, include, or be included in the base station 110 shown in FIG. 1.

The base station 310 may provide a first cell and the base station 315 may provide a second cell. In some aspects, the base station 310 and/or the base station 315 may provide a serving cell. In some aspects, the base station 310 and/or the base station 315 may provide a neighbor cell. A neighbor cell may be defined relative to a serving cell and a UE being served by the serving cell. For example, a neighbor cell may include a cell that is not a serving cell but that is within a detection range of a UE. In the examples shown in FIG. 3, for example, the first base station 310 may provide a serving cell that serves the UE 305. The second base station 315 may provide a neighbor cell—e.g., a cell that is different than the serving cell provided by the first base station 310 but that is geographically close enough to the UE 305 for the UE 305 to detect the neighbor cell, to transmit signals using the neighbor cell, to receive signals using the neighbor cell, and/or the like. In some aspects, any number of additional base stations may provide any number of additional neighbor cells.

In a multiple cell deployment, such as in the examples illustrated in FIG. 3, a UE may communicate with a serving cell (e.g., by transmitting signals to a base station that provides the serving cell and/or receiving signals transmitted by the base station). The UE also may monitor one or more neighbor cells (e.g., by measuring reference signals transmitted by one or more base stations that provide the one or more neighbor cells). According to various aspects, the UE may receive a communication from a base station using a UE reception (Rx) beam.

As shown by reference number 300, the UE 305 may receive a communication 320 from the first base station 310 using a first UE Rx beam 325. In some aspects, the UE 305 may select the first UE Rx beam 325 based at least in part on beam refinement procedures. In some aspects, the UE 305 may receive channel state information reference signals (CSI-RSs) associated with a number of UE Rx beams and may select the first UE Rx beam 325 based at least in part on one or more measurements associated with the CSI-RSs.

In some aspects, the first base station 310 may provide a serving cell and the communication 320 may include a physical downlink control channel (PDCCH) communication, a physical downlink shared channel (PDSCH) communication, and/or the like. In some aspects, the first base station 310 may provide a neighbor cell and the communication 320 may include a reference signal. For example, in some aspects, the communication 320 may include a CSI-RS Layer 3 (L3) signal.

A CSI-RS L3 signal may be used for L3 measurements (e.g., cell level measurements) to facilitate mobility management. In some aspects, a CSI-RS L3 signal may be a periodical wideband signal. In some aspects, the UE 305 may receive (e.g., from the first base station 310, the second base station 315, and/or the like) a configuration associated with the CSI-RS L3 signal. The configuration may indicate frequency domain resources associated with the CSI-RS L3 signal, time domain resources associated with the CSI-RS L3 signal, and/or the like. For example, in some aspects, the configuration may indicate a frequency domain density, a number of resource blocks (RBs), a time domain periodicity, slot indices, symbol indices, and/or the like. In some aspects, the first base station 310 may transmit a synchronization signal block (SSB) associated with the CSI-RS L3 signal. The SSB may be quasi co-located with the CSI-RS L3 signal so that the UE 305 may use the SSB to determine a reference cell timing to facilitate receiving the CSI-RS L3 signal.

In a multiple cell deployment, a number of base stations providing neighbor cells may transmit respective CSI-RS L3 signals for the UE to measure. For example, as shown by reference number 330, the second base station 315 may transmit a communication 335 to the UE 305. The UE 305 may receive the communication 335 using a second UE Rx beam 340. In some aspects, the communication 335 may include a CSI-RS L3. In some aspects, the second base station 315 may provide a serving cell, in which case the communication 335 may include a PDCCH communication, a PDSCH communication, a CSI-RS Layer 1 (L1) signal (e.g., for beam refinement), and/or the like. As shown in FIG. 3, the first UE Rx beam 325 and the second UE Rx beam 340 may be different.

In some cases, the UE 305 may be configured to obtain intra-frequency measurements using a CSI-RS L3 signal. An intra-frequency CSI-RS L3 signal is a CSI-RS L3 signal that a UE can measure without opening a measurement gap with respect to a bandwidth on which the UE receives another communication (e.g., a PDCCH communication from a serving cell, a PDSCH communication from a serving cell, another CSI-RS L3 from a different cell, and/or the like).

In some cases, intra-frequency signals may be transmitted and/or arrive at a UE simultaneously (or at least within a specified time period such as, for example, within a same slot, symbol, and/or the like). As shown by reference number 345, for example, the communication 320 may arrive at the UE 305 simultaneously with the communication 335. In a typical case, however, the UE 305 may be capable of receiving signals using only one UE Rx beam at a given time and/or during a specified time period. As a result, the UE 305 may not be able to receive the communication 320 and the communication 335. This may lead to failure to receive a serving cell signal (e.g., data and/or control channel communications), failure to detect neighbor cells, reduced flexibility in mobility, and/or the like.

Aspects of techniques and apparatuses described herein may facilitate beam selection for receiving CSI-RS L3 signals that may arrive simultaneously with serving cell signals, other CSI-RS L3 signals, and/or the like. In some aspects, a UE may receive a configuration that indicates a CSI-RS L3 signal corresponding to a first cell and may determine a first candidate UE Rx beam for receiving the CSI-RS L3 signal. The UE may determine, based at least in part on the first candidate UE Rx beam and a second candidate UE Rx beam associated with another signal, an angle of arrival (AoA) difference between an AoA associated with the CSI-RS L3 signal and an AoA associated with the other signal.

In some aspects, the UE may determine, based at least in part on the AoA difference, whether one of the first or second candidate UE Rx beams has a coverage region that overlaps a coverage region of the other candidate UE Rx beam such that both signals may be received using one of the first or second candidate UE Rx beams. If neither the first nor the second candidate UE Rx beam can be used to receive both signals, the UE may determine whether a third candidate UE Rx beam is available that has a coverage region that overlaps the coverage regions of the first and second UE Rx beams. In some aspects, the UE may use the third candidate UE Rx beam to receive both signals simultaneously (or within a specified time period). In some aspects, if a third candidate UE Rx beam is available that can be used to receive both signals, the UE may transmit an indicator to a base station associated with the second signal that indicates the reception conflict. The indicator may indicate that the base station is to refrain from transmitting a communication during the specified time period. In this way, aspects of the techniques described herein may facilitate receiving CSI-RS L3 signals simultaneously (or within a specified time period) with other signals, or, if simultaneous reception is not possible, to receive CSI-RS L3 signals without missing some other signals. As a result, aspects, may lead to an increased likelihood of receiving serving cell signals while monitoring neighbor cells, increased likelihood of detecting neighbor cells, increased flexibility in mobility, and/or the like.

As indicated above, FIG. 3 is provided as an example. Other examples may differ from what is described with regard to FIG. 3.

Figure 4:
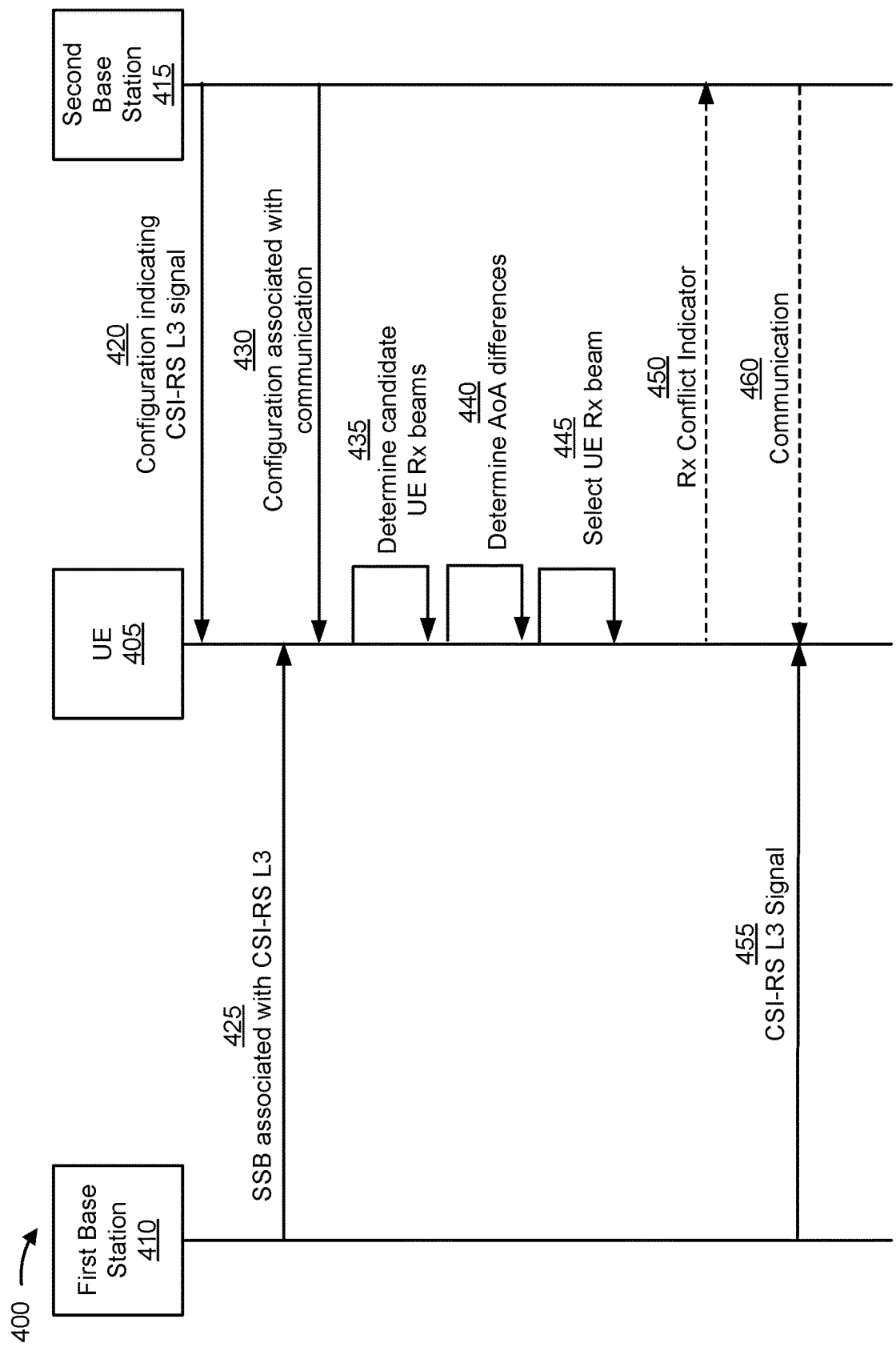
FIGS. 4 and 5 are diagrams illustrating examples associated with beam selection for receiving channel state information reference signals (CSI-RSs) for Layer 3 (L3) measurement, in accordance with the present disclosure.

FIG. 4 is a diagram illustrating an example 400 associated with beam selection for receiving CSI-RSs for L3 measurement, in accordance with the present disclosure. As shown, a UE 405 may communicate with a first base station 410 and a second base station 415. In some aspects, the UE 405 may be, be similar to, include, or be included in the UE 305 shown in FIG. 3, the UE 120 shown in FIG. 1, and/or the like. In some aspects, the first base station 410 and/or the second base station 415 may be, be similar to, include, or be included in the first base station 310 shown in FIG. 3, the second base station 315 shown in FIG. 3, the base station 110 shown in FIG. 1, and/or the like. In some aspects, a number of other base stations may communicate with the UE 405 in accordance with aspects described below.

As shown by reference number 420, the UE 405 may receive a configuration that indicates a CSI-RS L3 signal corresponding to a first cell. The first cell may be provided by the first base station 410. The first cell may be a neighbor cell. As shown, the UE 405 may receive the configuration from the second base station 415 (or another base station not illustrated). For example, in some aspects, the second base station 415 may provide a serving cell and may receive (e.g., via a backhaul communication), an indication of the configuration from the first base station 410. In some aspects, the first base station 410 may transmit the configuration to the UE 405. In some aspects, the configuration may indicate one or more time domain resources associated with the CSI-RS L3 signal, one or more frequency domain resources associated with the CSI-RS L3 signal, and/or the like.

As shown by reference number 425, the first base station 410 may transmit, and the UE 405 may receive an SSB associated with the CSI-RS L3 signal. The SSB may be quasi co-located with the CSI-RS L3 signal. In some aspects, the UE 405 may obtain, based at least in part on the SSB, timing information associated with the CSI-RS L3 signal.

As shown by reference number 430, the second base station 415 may transmit, and the UE 405 may receive, a configuration associated with a communication corresponding to a second cell. The second cell may be provided by the second base station 415. In some aspects, the second base station 415 may provide a serving cell, and the communication may include a PDCCH communication, a PDSCH communication, a CSI-RS L1 communication, and/or the like. In some aspects, the second base station 415 may provide a neighbor cell, and the communication may include an additional CSI-RS L3 signal. The configuration associated with the communication may indicate a type of communication, one or more time domain resources associated with the communication, one or more frequency domain resources associated with the communication, and/or the like.

As shown by reference number 435, the UE 405 may determine, based at least in part on the SSB, a first candidate UE Rx beam associated with the CSI-RS L3 signal. In some aspects, the UE 405 may determine the first candidate UE Rx beam based at least in part on a beam refinement operation. The first candidate UE Rx beam may include a first beam width. The UE 405 also may determine a second candidate UE Rx beam associated with the communication corresponding to the second cell. The second candidate UE Rx beam may include a second beam width.

As shown by reference number 440, the UE 405 may determine one or more AoA differences. For example, in some aspects, the UE 405 may determine a first AoA associated with the CSI-RS L3 signal. The UE 405 may determine the first AoA based at least in part on the SSB. In some aspects, the UE 405 may determine the first AoA based at least in part on the first candidate UE Rx beam. The UE 405 may determine a second AoA associated with the communication. In some aspects, the UE 405 may determine the second AoA based at least in part on the second candidate UE Rx beam. In some aspects, the UE 405 may determine an AoA difference between the first AoA and the second AoA. In some aspects, the UE 405 may determine an AoA difference between any number of different pairs of AoAs associated with any number of different signals that may be received from any number of different neighbor cells and/or serving cells. In some aspects, for example, the may UE 405 track UE Rx beams, respectively, for communicating with a serving cell for reception of data communications associated with certain UE Rx beams and for receiving CSI-RS L3 signals from neighbor cells.

As shown by reference number 445, the UE 405 may select, based at least in part on the AoA difference between the first AoA and the second AoA, a UE Rx beam for receiving the CSI-RS L3 signal. In some aspects, the UE 405 may select the UE Rx beam by determining, based at least in part on beam characteristic data associated with candidate UE Rx beams, whether a beam conflict exists and/or whether the beam conflict can be resolved using one of the candidate UE Rx beams. In some aspects, the beam characteristic data may be maintained in one or more codebooks. The UE 405 may determine that a beam conflict exists if two signals (e.g., the CSI-RS L3 signal and the communication corresponding to the second cell) are scheduled to be received by two different beams within a specified measurement time. The UE 405 may determine that a beam conflict may be resolved by determining that a candidate UE Rx beam is available that may be used to receive both signals during the measurement time.

In some aspects, for example, the UE 405 may determine, for a measurement time, whether the first candidate UE Rx beam covers the second candidate UE Rx beam. For example, the UE 405 may determine, based at least in part on the AoA difference, whether a first coverage region corresponding to the first candidate UE Rx beam overlaps a second coverage region corresponding to the second candidate UE Rx beam. In some aspects, if the first coverage region overlaps the second coverage region, the UE 405 may select the first candidate UE Rx beam.

In some aspects, if the first coverage region does not overlap the second coverage region, the UE 405 may determine whether the second coverage region overlaps the first coverage region. For example, in some aspects, if the first and second candidate UE Rx beams have overlapping coverage regions, the UE 405 may select the candidate UE Rx beam that includes a wider beam width than a bean width of the other candidate UE Rx beam.

In some aspects, if the first candidate UE Rx beam and the second candidate UE Rx beam do not overlap such that the CSI-RS L3 signal and the communication corresponding to the second cell cannot be received using one of the first or second candidate UE Rx beams, the UE 405 may determine whether a third candidate UE Rx beam is available that can be used to receive the CSI-RS L3 signal and the communication corresponding to the second cell. For example, in some aspects, the UE 405 may determine, based at least in part on the AoA difference, that a first coverage region corresponding to the first candidate UE Rx beam does not overlap a second coverage region corresponding to the second candidate UE Rx beam. The UE 405 may determining that a third coverage region corresponding to the third candidate UE Rx beam overlaps the first coverage region and the second coverage region.

However, in some aspects, a third candidate UE Rx beam that covers the first and second candidate UE Rx beams may not be available. In some aspects, where the second base station 415 provides a serving cell, the UE 405 may request that the second base station 415 refrain from transmitting the communication during the measurement time associated with reception, by the UE 405, of the CSI-RS L3 signal from the first base station 410. As shown by reference number 450, for example, if a beam is not available that can be used to receive the CSI-RS L3 and the communication corresponding to the second cell, the UE 405 may transmit, to the second cell (e.g., to the second base station 415), a beam conflict indicator that indicates that the second cell is to refrain from transmitting the communication corresponding to the second cell during the measurement time. In some aspects, the measurement time may include a slot. In some aspects, the beam conflict indicator may be carried in at least one of uplink control information (UCI), a medium access control (MAC) control element (MAC-CE), a radio resource control (RRC) message, and/or the like.

As shown by reference number 455, the first base station 410 may transmit, and the UE 405 may receive, the CSI-RS L3 signal using the UE Rx beam. As shown by reference number 460, the second base station 415 may transmit (or refrain from transmitting) the communication corresponding to the second cell. In this way, aspects may facilitate simultaneous reception of a CSI-RS L3 signal with another signal, reception of the CSI-RS L3 signal in lieu of another signal, and/or the like.

As indicated above, FIG. 4 is provided as an example. Other examples may differ from what is described with regard to FIG. 4.

Figure 5:
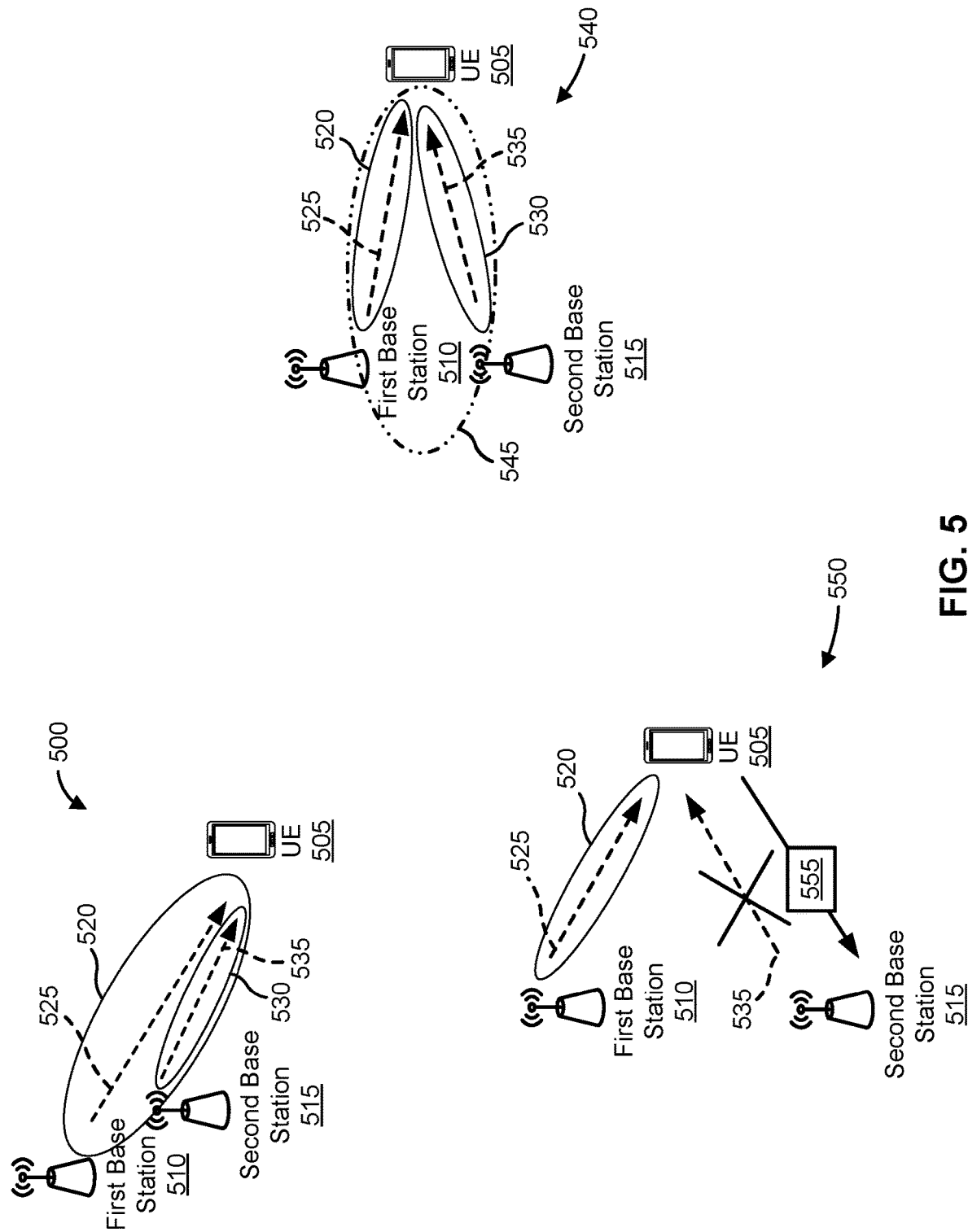

FIG. 5 includes diagrams illustrating examples associated with beam selection for receiving CSI-RSs for L3 measurement, in accordance with the present disclosure. As shown, a UE 505 may communicate with a first base station 510 and a second base station 515. In some aspects, the UE 505 may be, be similar to, include, or be included in the UE 405 shown in FIG. 4, the UE 305 shown in FIG. 3, the UE 120 shown in FIG. 1, and/or the like. In some aspects, the first base station 510 and/or the second base station 515 may be, be similar to, include, or be included in the first base station 410 shown in FIG. 4, the second base station 415 shown in FIG. 4, the first base station 310 shown in FIG. 3, the second base station 315 shown in FIG. 3, the base station 110 shown in FIG. 1, and/or the like. In some aspects, a number of other base stations may communicate with the UE 405 in accordance with aspects described above.

According to various aspects, the UE 505 may select a candidate UE Rx beam for receiving a CSI-RS L3 signal corresponding to a first cell that may be provided by the first base station 410. For example, as shown by reference number 500, the UE 505 may determine a first candidate UE Rx beam 520 for receiving a CSI-RS L3 signal from the first base station 410 and a second candidate UE Rx beam 530 for receiving a communication 535 corresponding to a second cell provided by the second base station 515. In some aspects, as shown, the UE 505 may determine that a coverage region associated with the first candidate UE Rx beam 520 overlaps a coverage region associated with the second candidate UE Rx beam 530 (e.g., by determining that the coverage areas intersect and that the first candidate UE Rx beam is wider than the second candidate beam). As a result, the UE 505 may select the first candidate UE Rx beam 520 for receiving the CSI-RS L3 signal and the communication corresponding to the second cell.

In some aspects, the UE 505 may determine that a coverage region associated with the second candidate UE Rx beam 530 overlaps a coverage region associated with the first candidate UE Rx beam 520. As a result, the UE 505 may select the second candidate UE Rx beam 520 for receiving the CSI-RS L3 signal and the communication corresponding to the second cell.

As shown by reference number 540, if the first candidate UE Rx beam 520 and the second candidate UE Rx beam 530 do not overlap such that the CSI-RS L3 signal 525 and the communication 535 corresponding to the second cell cannot be received using one of the first or second candidate UE Rx beams 520 or 530, the UE 505 may determine that a third candidate UE Rx beam 545 is available that can be used to receive the CSI-RS L3 signal 525 and the communication 535 corresponding to the second cell. In some aspects, the third candidate UE Rx beam 545 may be wider than the first candidate UE Rx beam 520, the second candidate UE Rx beam 530, and/or the like.

In some aspects, a candidate UE Rx beam that can be used to receive the CSI-RS L3 signal 525 and the communication 535 may not be available during a measurement time. As shown by reference number 550, based at least in part on determining that a UE Rx beam is not available for simultaneous reception, the UE 505 may transmit, to the second base station 515, a beam conflict indicator 555 that indicates that the second cell (e.g., the second base station 515) is to refrain from transmitting the communication 535 during the measurement time. As a result, as shown, the first base station 510 may transmit, and the UE 505 may receive, the CSI-RS L3 signal 525 using the first candidate UE Rx beam 520, and the second base station 515 may refrain from transmitting the communication 535 (as indicated by the "X" superimposed on the arrow representing the communication 535).

As indicated above, FIG. 5 is provided as an example. Other examples may differ from what is described with regard to FIG. 5.

Figure 6:
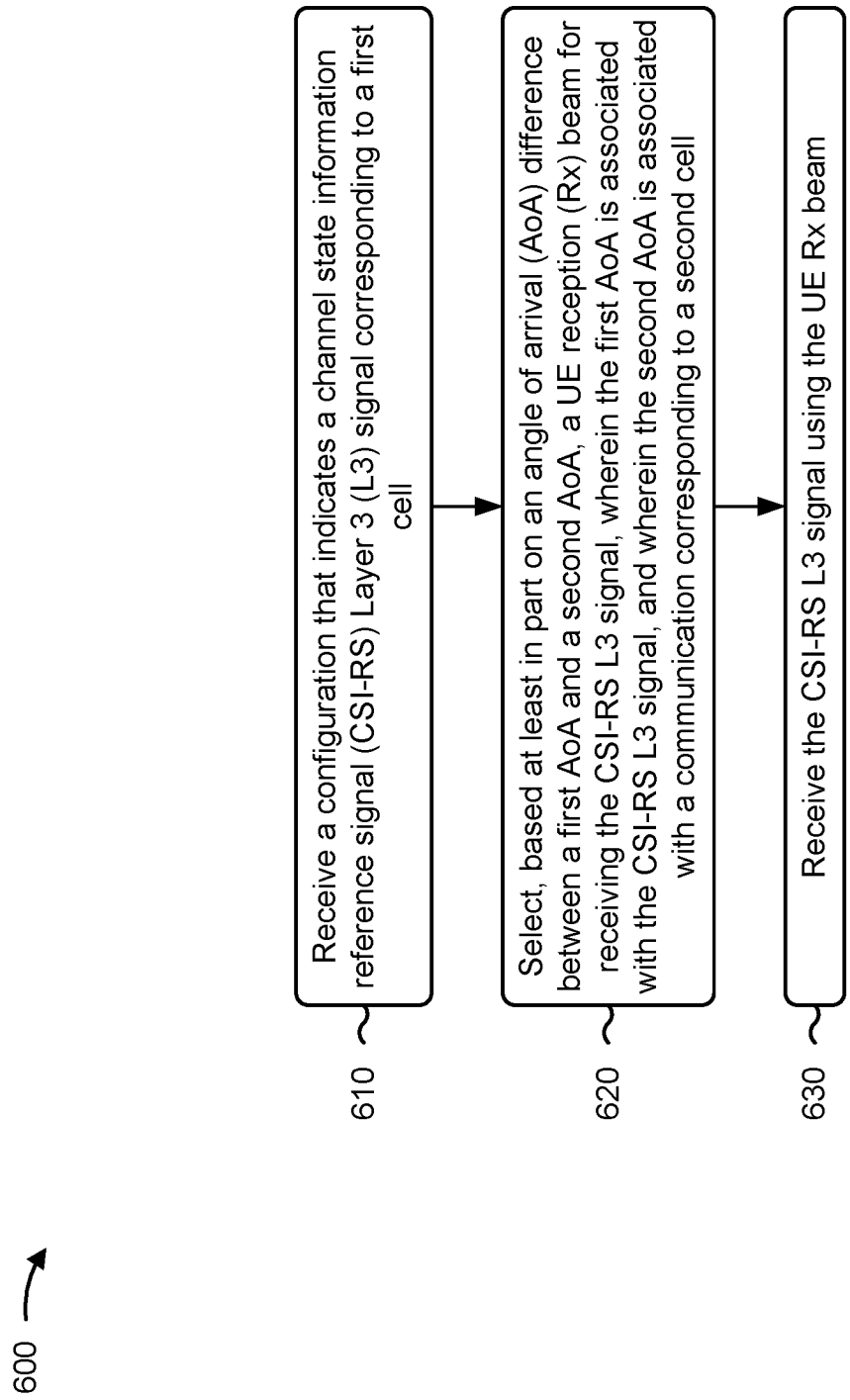
FIGS. 6 and 7 are diagrams illustrating example processes associated with beam selection for receiving CSI-RSs for L3 measurement, in accordance with the present disclosure.

FIG. 6 is a diagram illustrating an example process 600 performed, for example, by a UE, in accordance with the present disclosure. Example process 600 is an example where the UE (e.g., UE 120) performs operations associated with beam selection for receiving CSI-RSs for L3 measurement.

As shown in FIG. 6, in some aspects, process 600 may include receiving a configuration that indicates a CSI-RS L3 signal corresponding to a first cell (block 610). For example, the UE (e.g., using reception component 802 of FIG. 8) may receive a configuration that indicates a CSI-RS L3 signal corresponding to a first cell, as described above.

As further shown in FIG. 6, in some aspects, process 600 may include selecting, based at least in part on an AoA difference between a first AoA and a second AoA, a UE Rx beam for receiving the CSI-RS L3 signal, wherein the first AoA is associated with the CSI-RS L3 signal, and wherein the second AoA is associated with a communication corresponding to a second cell (block 620). For example, the UE (e.g., using communication manager 808 of FIG. 8) may select, based at least in part on an AoA difference between a first AoA and a second AoA, a UE Rx beam for receiving the CSI-RS L3 signal, wherein the first AoA is associated with the CSI-RS L3 signal, and wherein the second AoA is associated with a communication corresponding to a second cell, as described above.

As further shown in FIG. 6, in some aspects, process 600 may include receiving the CSI-RS L3 signal using the UE Rx beam (block 630). For example, the UE (e.g., using reception component 802 of FIG. 8) may receive the CSI-RS L3 signal using the UE Rx beam, as described above.

Process 600 may include additional aspects, such as any single aspect or any combination of aspects described below and/or in connection with one or more other processes described elsewhere herein.

In a first aspect, process 600 includes receiving an SSB associated with the CSI-RS L3 signal.

In a second aspect, alone or in combination with the first aspect, the SSB is quasi co-located with the CSI-RS L3 signal.

In a third aspect, alone or in combination with one or more of the first and second aspects, process 600 includes determining the first AoA based at least in part on the SSB.

In a fourth aspect, alone or in combination with one or more of the first through third aspects, process 600 includes determining, based at least in part on the SSB, a first candidate UE Rx beam associated with the CSI-RS L3 signal, where the first candidate UE Rx beam has a first beam width, and determining a second candidate UE Rx beam associated with the communication corresponding to the second cell, where the second candidate UE Rx beam has a second beam width.

In a fifth aspect, alone or in combination with one or more of the first through fourth aspects, process 600 includes determining the first AoA based at least in part on the first candidate UE Rx beam, determining the second AoA based at least in part on the second candidate UE Rx beam, and determining the AoA difference between the first AoA and the second AoA.

In a sixth aspect, alone or in combination with one or more of the first through fifth aspects, the UE Rx beam comprises the first candidate UE Rx beam.

In a seventh aspect, alone or in combination with one or more of the first through sixth aspects, selecting the UE Rx beam comprises determining, based at least in part on the AoA difference, that a first coverage region corresponding to the first candidate UE Rx beam overlaps a second coverage region corresponding to the second candidate UE Rx beam, and determining that the first beam width is greater than the second beam width.

In an eighth aspect, alone or in combination with one or more of the first through seventh aspects, the UE Rx beam comprises the second candidate UE Rx beam.

In a ninth aspect, alone or in combination with one or more of the first through eighth aspects, selecting the UE Rx beam comprises determining, based at least in part on the AoA difference, that a first coverage region corresponding to the first candidate UE Rx beam overlaps a second coverage region corresponding to the second candidate UE Rx beam, and determining that the second beam width is greater than the first beam width.

In a tenth aspect, alone or in combination with one or more of the first through ninth aspects, the UE Rx beam comprises a third candidate UE Rx beam.

In an eleventh aspect, alone or in combination with one or more of the first through tenth aspects, selecting the UE Rx beam comprises determining, based at least in part on the AoA difference, that a first coverage region corresponding to the first candidate UE Rx beam does not overlap a second coverage region corresponding to the second candidate UE Rx beam, and determining that a third coverage region corresponding to the third candidate UE Rx beam overlaps the first coverage region and the second coverage region.

In a twelfth aspect, alone or in combination with one or more of the first through eleventh aspects, the first cell comprises a neighbor cell.

In a thirteenth aspect, alone or in combination with one or more of the first through twelfth aspects, the second cell comprises a neighbor cell.

In a fourteenth aspect, alone or in combination with one or more of the first through thirteenth aspects, the second cell comprises a serving cell.

In a fifteenth aspect, alone or in combination with one or more of the first through fourteenth aspects, process 600 includes determining that a first coverage region corresponding to the first candidate UE Rx beam does not overlap a second coverage region corresponding to the second candidate UE Rx beam, and determining that a third candidate UE Rx beam having a third coverage region that overlaps the first coverage region and the second coverage region is not available in connection with a measurement time associated with the CSI-RS L3 signal, where selecting the UE Rx beam comprises selecting the first candidate UE Rx beam based at least in part on determining that the third candidate UE Rx beam is not available.

In a sixteenth aspect, alone or in combination with one or more of the first through fifteenth aspects, process 600 includes transmitting, to the serving cell, a beam conflict indicator that indicates that the serving cell is to refrain from transmitting the communication corresponding to the second cell during the measurement time.

In a seventeenth aspect, alone or in combination with one or more of the first through sixteenth aspects, the beam conflict indicator is carried in at least one of UCI, a MAC-CE, or an RRC message.

In an eighteenth aspect, alone or in combination with one or more of the first through seventeenth aspects, the measurement time includes a slot.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
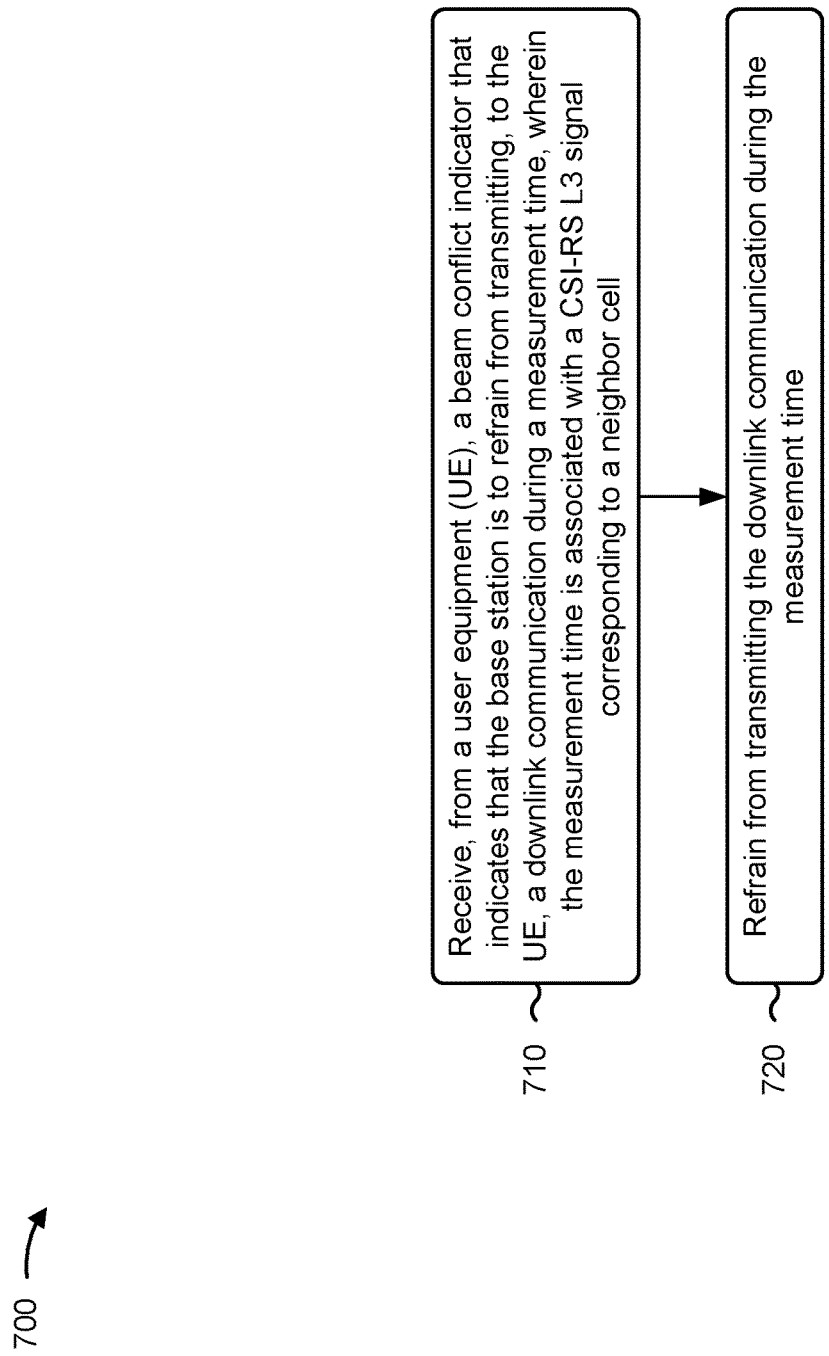

FIG. 7 is a diagram illustrating an example process 700 performed, for example, by a base station, in accordance with the present disclosure. Example process 700 is an example where the base station (e.g., base station 110) performs operations associated with beam selection for receiving CSI-RSs for L3 measurement.

As shown in FIG. 7, in some aspects, process 700 may include receiving, from a UE, a beam conflict indicator that indicates that the base station is to refrain from transmitting, to the UE, a downlink communication during a measurement time, wherein the measurement time is associated with a CSI-RS L3 signal corresponding to a neighbor cell (block 710). For example, the base station (e.g., using reception component 902 of FIG. 9) may receive, from a UE, a beam conflict indicator that indicates that the base station is to refrain from transmitting, to the UE, a downlink communication during a measurement time, wherein the measurement time is associated with a CSI-RS L3 signal corresponding to a neighbor cell, as described above.

As further shown in FIG. 7, in some aspects, process 700 may include refraining from transmitting the downlink communication during the measurement time (block 720). For example, the base station (e.g., using transmission component 904 of FIG. 9) may refrain from transmitting the downlink communication during the measurement time, as described above.

Process 700 may include additional aspects, such as any single aspect or any combination of aspects described below and/or in connection with one or more other processes described elsewhere herein.

In a first aspect, the measurement time includes a slot.

In a second aspect, alone or in combination with the first aspect, the beam conflict indicator is carried in at least one of UCI, a MAC-CE, or an RRC message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
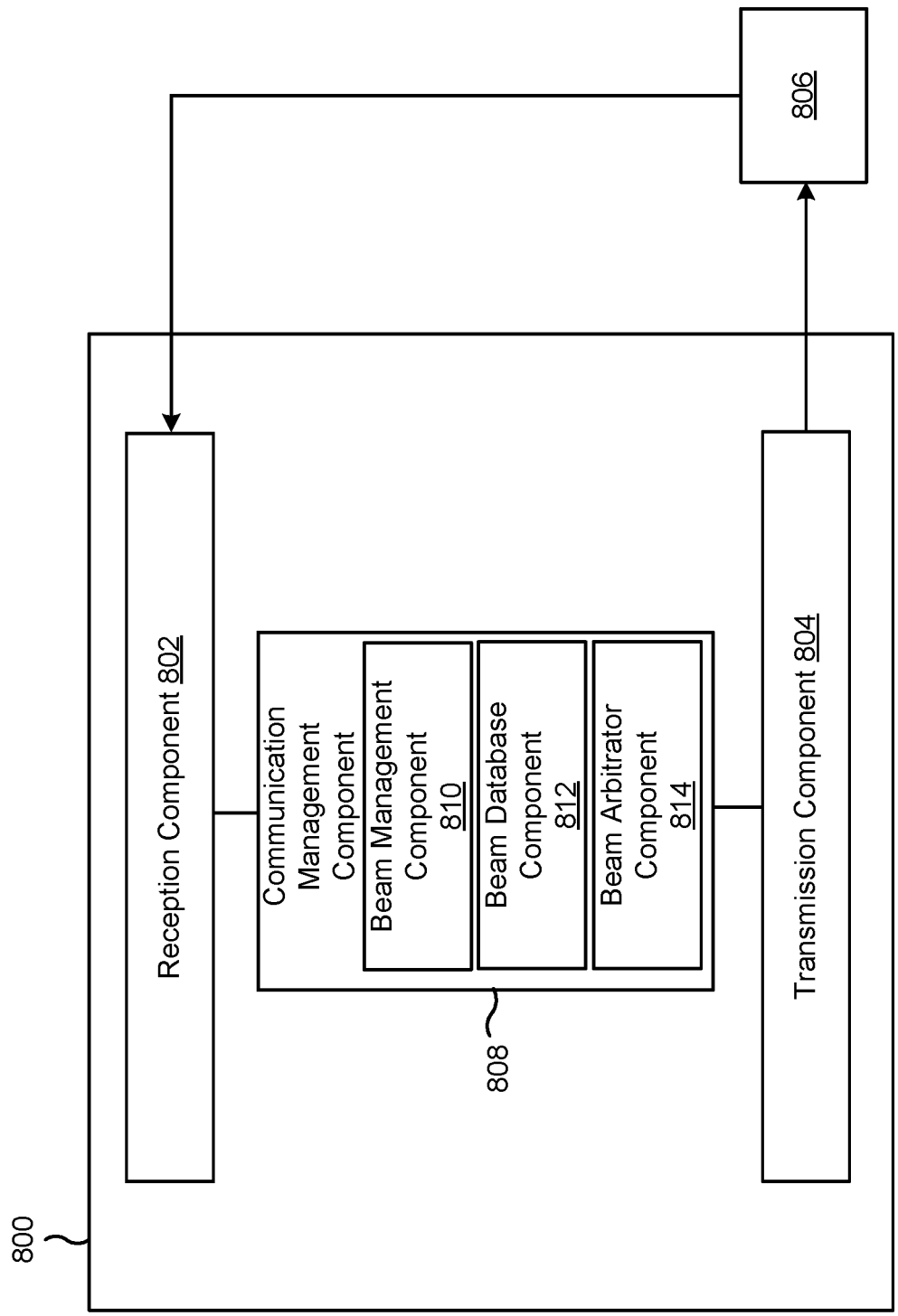
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a communication management component 808, a beam management component 810, a beam database component 812, or a beam arbitrator component 814, among other examples. In some aspects, the communication management component 808 may include the beam management component 810, the beam database component 812, and/or the beam arbitrator component 814. In some aspects, the communication management component 808 may include the reception component 802, the transmission component 804, and/or the like.

In some aspects, the apparatus 800 may be configured to perform one or more operations described herein in connection with FIGS. 4 and 5. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive a configuration that indicates a CSI-RS L3 signal corresponding to a first cell. The communication management component 808 may select, based at least in part on an AoA difference between a first AoA and a second AoA, a UE Rx beam for receiving the CSI-RS L3 signal, where the first AoA is associated with the CSI-RS L3 signal, and wherein the second AoA is associated with a communication corresponding to a second cell. In some aspects, the communication management component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The reception component 802 may receive the CSI-RS L3 signal using the UE Rx beam.

The reception component 802 may receive an SSB associated with the CSI-RS L3 signal. The beam management component 810 may determine, based at least in part on the SSB, a first candidate UE Rx beam associated with the CSI-RS L3 signal, where the first candidate UE Rx beam has a first beam width. The beam management component 810 may determine a second candidate UE Rx beam associated with the communication corresponding to the second cell, where the second candidate UE Rx beam has a second beam width. In some aspects, the beam management component 810 may include one or more antennas, a demodulator, a MIMO detector, a receive processor, a modulator, a controller/processor, a memory, or a combination thereof, of the UE described above in connection with FIG. 2.

The beam management component 814 may determine, a first AoA based at least in part on the first candidate UE Rx beam and a second AoA based at least in part on the second candidate UE Rx beam. The beam management component 810 may determine the AoA difference between the first AoA and the second AoA. The beam management component 810 may provide beam indices, corresponding to identified candidate UE Rx beams, to the beam arbitrator component 814. The beam management component 810 may provide AoA measurements, AoA differences, and/or the like to the beam arbitrator component 814.

The beam arbitrator component 814 may, based at least in part on an AoA difference, select a UE Rx beam for receiving the CSI-RS L3 signal. In some aspects, the beam arbitrator component 814 may include a controller/processor, a memory, or a combination thereof, of the UE described above in connection with FIG. 2. The beam arbitrator component 814 may select the UE Rx beam based at least in part on one or more beam characteristics such as, for example, beam shape, coverage regions, and/or the like. Beam characteristics may be maintained in the beam database component 812 and the beam arbitrator component 814 may access the database component 812 to obtain beam characteristics for use in selecting the UE Rx beam. In some aspects, beam characteristics may be associated with corresponding beam indices. In some aspects, the beam database component 812 may include one or more codebooks that may be used by the beam arbitrator component for facilitating selection of the UE Rx beam.

For example, in some aspects, the beam arbitrator component 814 may receive, from the beam management component 810, two or more beam indices corresponding to the candidate UE Rx beams. The beam arbitrator component 814 may access a codebook maintained by the beam database component 814 and determine beam characteristics from the codebook based on the indices. Based on the beam characteristics, the beam arbitrator component 814 may determine whether a first candidate UE Rx beam has a coverage region that overlaps a coverage region of a second candidate UE Rx beam. If the first candidate UE Rx beam does not have a coverage region that overlaps the coverage region of the second candidate UE Rx beam (or vice-versa), the beam arbitrator component 814 may determine, based at least in part on the beam characteristics, whether a third candidate UE Rx beam is available and includes a coverage region that overlaps the coverage regions of the first and second candidate UE Rx beams so that the third candidate UE Rx beam may be used to receive the communications corresponding to the first candidate UE Rx beam and the second candidate UE Rx beam. If the beam arbitrator component 814 identifies a candidate UE Rx beam that may be used to receive both communications, the beam arbitrator component 814 may determine, based at least in part on the beam characteristics, a proper gain setting for reception, a proper timing for reception, and/or the like, and may provide those settings to the reception component 802.

If the beam arbitrator component 814 fails to resolve the Rx beam conflict by determining that a candidate UE Rx beam that can be used to receive both communications within a specified measurement time is not available, the beam arbitrator component 814 may cause the transmission component 804 (e.g., an uplink signal encoder) to transmit a conflict indicator to the network (e.g., to a base station represented in FIG. 8 by apparatus 806), as explained above.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
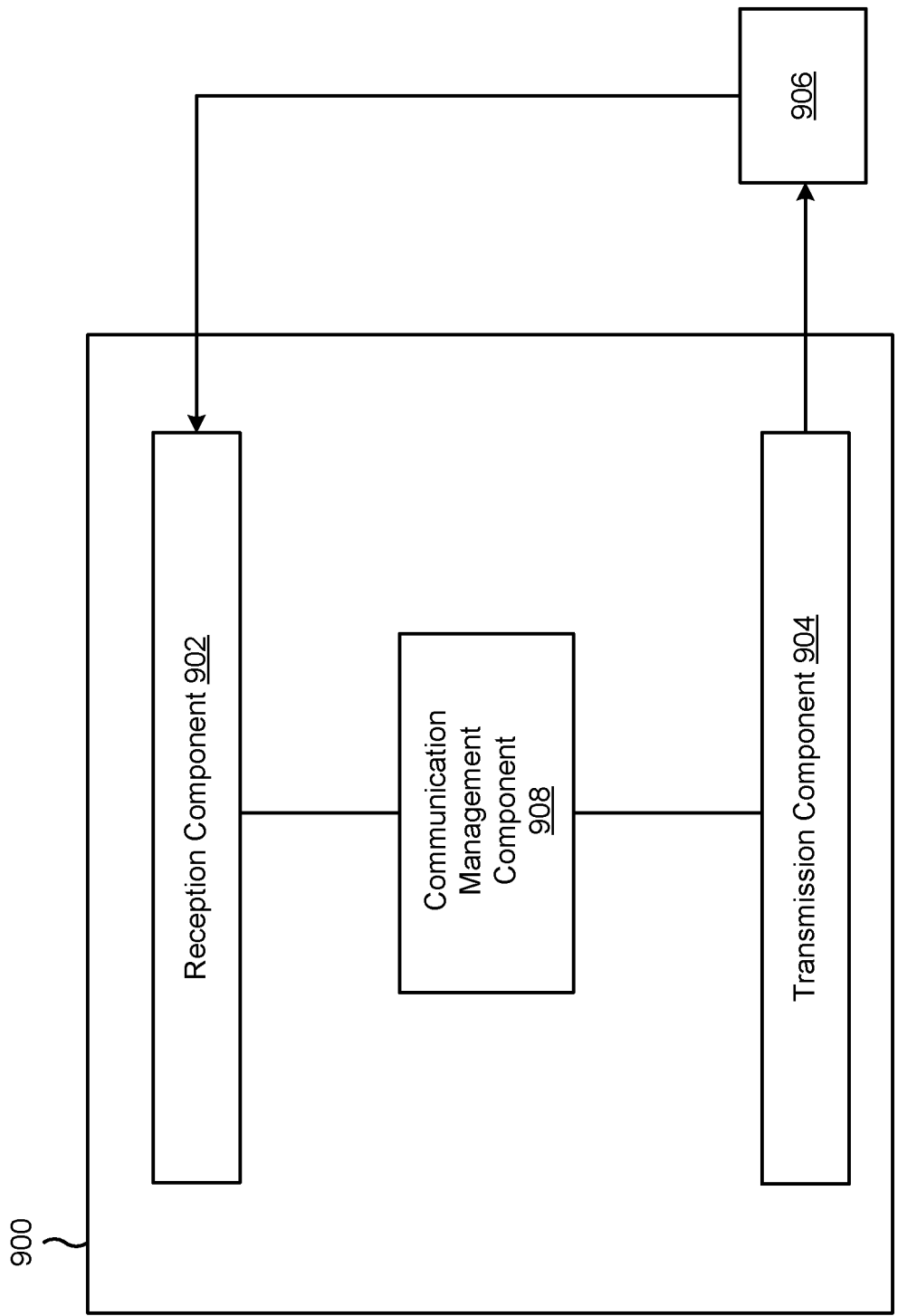

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a communication management component 908, among other examples.

In some aspects, the apparatus 900 may be configured to perform one or more operations described herein in connection with FIGS. 4 and 5. Additionally or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, a beam conflict indicator that indicates that the base station is to refrain from transmitting, to the UE, a downlink communication during a measurement time, wherein the measurement time is associated with a CSI-RS L3 signal corresponding to a neighbor cell. The communication management component 908 may cause the transmission component 904 to refrain from transmitting the downlink communication during the measurement time. In some aspects, the communication management component 908 may include a controller/processor, a memory, or a combination thereof, of the base station described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a configuration that indicates a channel state information reference signal (CSI-RS) Layer 3 (L3) signal corresponding to a first cell; selecting, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell; and receiving the CSI-RS L3 signal using the UE Rx beam.

Aspect 2: The method of Aspect 1, further comprising receiving a synchronization signal block (SSB) associated with the CSI-RS L3 signal.

Aspect 3: The method of Aspect 2, wherein the SSB is quasi co-located with the CSI-RS L3 signal.

Aspect 4: The method of either of Aspects 2 or 3, further comprising determining the first AoA based at least in part on the SSB.

Aspect 5: The method of any of Aspects 2-4, further comprising: determining, based at least in part on the SSB, a first candidate UE Rx beam associated with the CSI-RS L3 signal, wherein the first candidate UE Rx beam has a first beam width; and determining a second candidate UE Rx beam associated with the communication corresponding to the second cell, wherein the second candidate UE Rx beam has a second beam width.

Aspect 6: The method of Aspect 5, further comprising: determining the first AoA based at least in part on the first candidate UE Rx beam; determining the second AoA based at least in part on the second candidate UE Rx beam; and determining the AoA difference between the first AoA and the second AoA.

Aspect 7: The method of either of Aspects 5 or 6, wherein the UE Rx beam comprises the first candidate UE Rx beam.

Aspect 8: The method of Aspect 7, wherein selecting the UE Rx beam comprises: determining, based at least in part on the AoA difference, that a first coverage region corresponding to the first candidate UE Rx beam overlaps a second coverage region corresponding to the second candidate UE Rx beam; and determining that the first beam width is greater than the second beam width.

Aspect 9: The method of either of Aspects 5 or 6, wherein the UE Rx beam comprises the second candidate UE Rx beam.

Aspect 10: The method of Aspect 9, wherein selecting the UE Rx beam comprises: determining, based at least in part on the AoA difference, that a first coverage region corresponding to the first candidate UE Rx beam overlaps a second coverage region corresponding to the second candidate UE Rx beam; and determining that the second beam width is greater than the first beam width.

Aspect 11: The method of either of Aspects 5 or 6, wherein the UE Rx beam comprises a third candidate UE Rx beam.

Aspect 12: The method of Aspect 11, wherein selecting the UE Rx beam comprises: determining, based at least in part on the AoA difference, that a first coverage region corresponding to the first candidate UE Rx beam does not overlap a second coverage region corresponding to the second candidate UE Rx beam; and determining that a third coverage region corresponding to the third candidate UE Rx beam overlaps the first coverage region and the second coverage region.

Aspect 13: The method of any of Aspects 1-12, wherein the first cell comprises a neighbor cell.

Aspect 14: The method of any of Aspects 1-13, wherein the second cell comprises a neighbor cell.

Aspect 15: The method of any of Aspects 1-14, wherein the second cell comprises a serving cell.

Aspect 16: The method of Aspect 15, further comprising: determining that a first coverage region corresponding to a first candidate UE Rx beam does not overlap a second coverage region corresponding to a second candidate UE Rx beam; and determining that a third candidate UE Rx beam having a third coverage region that overlaps the first coverage region and the second coverage region is not available in connection with a measurement time associated with the CSI-RS L3 signal, wherein selecting the UE Rx beam comprises selecting the first candidate UE Rx beam based at least in part on determining that the third candidate UE Rx beam is not available.

Aspect 17: The method of Aspect 16, further comprising transmitting, to the serving cell, a beam conflict indicator that indicates that the serving cell is to refrain from transmitting the communication corresponding to the second cell during the measurement time.

Aspect 18: The method of Aspect 17, wherein the beam conflict indicator is carried in at least one of: uplink control information, a medium access control (MAC) control element, or a radio resource control message.

Aspect 19: The method of any of Aspects 16-18, wherein the measurement time includes a slot.

Aspect 20: A method of wireless communication performed by a base station, comprising: receiving, from a user equipment (UE), a beam conflict indicator that indicates that the base station is to refrain from transmitting, to the UE, a downlink communication during a measurement time, wherein the measurement time is associated with a channel state information reference signal (CSI-RS) Layer 3 (L3) signal corresponding to a neighbor cell; and refraining from transmitting the downlink communication during the measurement time.

Aspect 21: The method of Aspect 20, wherein the measurement time includes a slot.

Aspect 22: The method of either of Aspects 20 or 21, wherein the beam conflict indicator is carried in at least one of: uplink control information, a medium access control (MAC) control element, or a radio resource control message.

Aspect 23: An apparatus for wireless communication at a device, comprising a processor; memory coupled with the processor; and instructions stored in the memory and executable by the processor to cause the apparatus to perform the method of one or more of Aspects 1-19.

Aspect 24: A device for wireless communication, comprising a memory and one or more processors coupled to the memory, the one or more processors configured to perform the method of one or more of Aspects 1-19.

Aspect 25: An apparatus for wireless communication, comprising at least one means for performing the method of one or more of Aspects 1-19.

Aspect 26: A non-transitory computer-readable medium storing code for wireless communication, the code comprising instructions executable by a processor to perform the method of one or more of Aspects 1-19.

Aspect 27: A non-transitory computer-readable medium storing a set of instructions for wireless communication, the set of instructions comprising one or more instructions that, when executed by one or more processors of a device, cause the device to perform the method of one or more of Aspects 1-19.

Aspect 28: An apparatus for wireless communication at a device, comprising a processor; memory coupled with the processor; and instructions stored in the memory and executable by the processor to cause the apparatus to perform the method of one or more of Aspects 20-22.

Aspect 29: A device for wireless communication, comprising a memory and one or more processors coupled to the memory, the one or more processors configured to perform the method of one or more of Aspects 20-22.

Aspect 30: An apparatus for wireless communication, comprising at least one means for performing the method of one or more of Aspects 20-22.

Aspect 31: A non-transitory computer-readable medium storing code for wireless communication, the code comprising instructions executable by a processor to perform the method of one or more of Aspects 20-22.

Aspect 32: A non-transitory computer-readable medium storing a set of instructions for wireless communication, the set of instructions comprising one or more instructions that, when executed by one or more processors of a device, cause the device to perform the method of one or more of Aspects 20-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving a configuration that indicates a channel state information reference signal (CSI-RS) Layer 3 (L3) signal corresponding to a first cell;
    selecting, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell; and
    receiving the CSI-RS L3 signal using the UE Rx beam.

2. The method of claim 1, further comprising receiving a synchronization signal block (SSB) associated with the CSI-RS L3 signal.

3. The method of claim 2, wherein the SSB is quasi co-located with the CSI-RS L3 signal.

4. The method of claim 2, further comprising determining the first AoA based at least in part on the SSB.

5. The method of claim 2, further comprising:
    determining, based at least in part on the SSB, a first candidate UE Rx beam associated with the CSI-RS L3 signal, wherein the first candidate UE Rx beam has a first beam width; and
    determining a second candidate UE Rx beam associated with the communication corresponding to the second cell, wherein the second candidate UE Rx beam has a second beam width.

6. The method of claim 5, further comprising:
    determining the first AoA based at least in part on the first candidate UE Rx beam;
    determining the second AoA based at least in part on the second candidate UE Rx beam; and
    determining the AoA difference between the first AoA and the second AoA.

7. The method of claim 5, wherein the UE Rx beam comprises the first candidate UE Rx beam, and wherein selecting the UE Rx beam comprises:
- determining, based at least in part on the AoA difference, that a first coverage region corresponding to the first candidate UE Rx beam overlaps a second coverage region corresponding to the second candidate UE Rx beam; and
- determining that the first beam width is greater than the second beam width.

8. The method of claim 5, wherein the UE Rx beam comprises the second candidate UE Rx beam, and wherein selecting the UE Rx beam comprises:
- determining, based at least in part on the AoA difference, that a first coverage region corresponding to the first candidate UE Rx beam overlaps a second coverage region corresponding to the second candidate UE Rx beam; and
- determining that the second beam width is greater than the first beam width.

9. The method of claim 5, wherein the UE Rx beam comprises a third candidate UE Rx beam, and wherein selecting the UE Rx beam comprises:
- determining, based at least in part on the AoA difference, that a first coverage region corresponding to the first candidate UE Rx beam does not overlap a second coverage region corresponding to the second candidate UE Rx beam; and
- determining that a third coverage region corresponding to the third candidate UE Rx beam overlaps the first coverage region and the second coverage region.

10. The method of claim 1, wherein the first cell comprises a neighbor cell.

11. The method of claim 1, wherein the second cell comprises at least one of a neighbor cell or a serving cell.

12. The method of claim 11, further comprising:
- determining that a first coverage region corresponding to a first candidate UE Rx beam does not overlap a second coverage region corresponding to a second candidate UE Rx beam; and
- determining that a third candidate UE Rx beam having a third coverage region that overlaps the first coverage region and the second coverage region is not available in connection with a measurement time associated with the CSI-RS L3 signal,
  - wherein selecting the UE Rx beam comprises selecting the first candidate UE Rx beam based at least in part on determining that the third candidate UE Rx beam is not available.

13. The method of claim 12, further comprising transmitting, to the serving cell, a beam conflict indicator that indicates that the serving cell is to refrain from transmitting the communication corresponding to the second cell during the measurement time.

14. The method of claim 13, wherein the beam conflict indicator is carried in at least one of:
- uplink control information,
- a medium access control (MAC) control element, or
- a radio resource control message.

15. The method of claim 12, wherein the measurement time includes a slot.

16. A method of wireless communication performed by a base station, comprising:
- receiving, from a user equipment (UE), a beam conflict indicator that indicates that the base station is to refrain from transmitting, to the UE, a downlink communication during a measurement time, wherein the measurement time is associated with a channel state information reference signal (CSI-RS) Layer 3 (L3) signal corresponding to a neighbor cell; and
- refraining from transmitting the downlink communication during the measurement time.

17. The method of claim 16, wherein the measurement time includes a slot.

18. The method of claim 16, wherein the beam conflict indicator is carried in at least one of:
- uplink control information,
- a medium access control (MAC) control element, or
- a radio resource control message.

19. A user equipment (UE) for wireless communication, comprising:
- a memory; and
- one or more processors coupled to the memory, the memory and the one or more processors configured to:
  - receive a configuration that indicates a channel state information reference signal (CSI-RS) Layer 3 (L3) signal corresponding to a first cell;
  - select, based at least in part on an angle of arrival (AoA) difference between a first AoA and a second AoA, a UE reception (Rx) beam for receiving the CSI-RS L3 signal, wherein the first AoA is associated with the CSI-RS L3 signal, and wherein the second AoA is associated with a communication corresponding to a second cell; and
  - receive the CSI-RS L3 signal using the UE Rx beam.

20. The UE of claim 19, wherein the one or more processors are further configured to receive a synchronization signal block (SSB) associated with the CSI-RS L3 signal.

21. The UE of claim 20, wherein the SSB is quasi co-located with the CSI-RS L3 signal.

22. The UE of claim 20, wherein the one or more processors are further configured to determine the first AoA based at least in part on the SSB.

23. The UE of claim 20, wherein the one or more processors are further configured to:
- determine, based at least in part on the SSB, a first candidate UE Rx beam associated with the CSI-RS L3 signal, wherein the first candidate UE Rx beam has a first beam width; and
- determine a second candidate UE Rx beam associated with the communication corresponding to the second cell, wherein the second candidate UE Rx beam has a second beam width.

24. The UE of claim 23, wherein the one or more processors are further configured to:
- determine the first AoA based at least in part on the first candidate UE Rx beam;
- determine the second AoA based at least in part on the second candidate UE Rx beam; and
- determine the AoA difference between the first AoA and the second AoA.

25. The UE of claim 23, wherein the UE Rx beam comprises the first candidate UE Rx beam, and wherein the one or more processors, when selecting the UE Rx beam, are configured to:
- determine, based at least in part on the AoA difference, that a first coverage region corresponding to the first candidate UE Rx beam overlaps a second coverage region corresponding to the second candidate UE Rx beam; and
- determine that the first beam width is greater than the second beam width.

26. The UE of claim 23, wherein the UE Rx beam comprises the second candidate UE Rx beam, and wherein the one or more processors, when selecting the UE Rx beam, are configured to:
 determine, based at least in part on the AoA difference, that a first coverage region corresponding to the first candidate UE Rx beam overlaps a second coverage region corresponding to the second candidate UE Rx beam; and
 determine that the second beam width is greater than the first beam width.

27. The UE of claim 23, wherein the UE Rx beam comprises a third candidate UE Rx beam, and wherein the one or more processors, when selecting the UE Rx beam, are configured to:
 determine, based at least in part on the AoA difference, that a first coverage region corresponding to the first candidate UE Rx beam does not overlap a second coverage region corresponding to the second candidate UE Rx beam; and
 determine that a third coverage region corresponding to the third candidate UE Rx beam overlaps the first coverage region and the second coverage region.

28. The UE of claim 23, wherein the second cell comprises a serving cell, and wherein the one or more processors are further configured to:
 determine that a first coverage region corresponding to the first candidate UE Rx beam does not overlap a second coverage region corresponding to the second candidate UE Rx beam; and
 determine that a third candidate UE Rx beam having a third coverage region that overlaps the first coverage region and the second coverage region is not available in connection with a measurement time associated with the CSI-RS L3 signal,
 wherein the one or more processors, when selecting the UE Rx beam, are configured to select the first candidate UE Rx beam based at least in part on determining that the third candidate UE Rx beam is not available.

29. The UE of claim 28, wherein the one or more processors are further configured to transmit, to the serving cell, a beam conflict indicator that indicates that the serving cell is to refrain from transmitting the communication corresponding to the second cell during the measurement time.

30. A base station for wireless communication, comprising:
 a memory; and
 one or more processors coupled to the memory, the memory and the one or more processors configured to:
  receive, from a user equipment (UE), a beam conflict indicator that indicates that the base station is to refrain from transmitting, to the UE, a downlink communication during a measurement time, wherein the measurement time is associated with a channel state information reference signal (CSI-RS) Layer 3 (L3) signal corresponding to a neighbor cell; and
  refrain from transmitting the downlink communication during the measurement time.

* * * * *